Dec. 15, 1970          KAZUO HIYAMA          3,546,856

METHOD OF HARVESTING VINE BORNE CROPS

Filed March 8, 1968          4 Sheets-Sheet 1

KAZUO HIYAMA
INVENTOR

Huebner & Worrel
ATTORNEYS

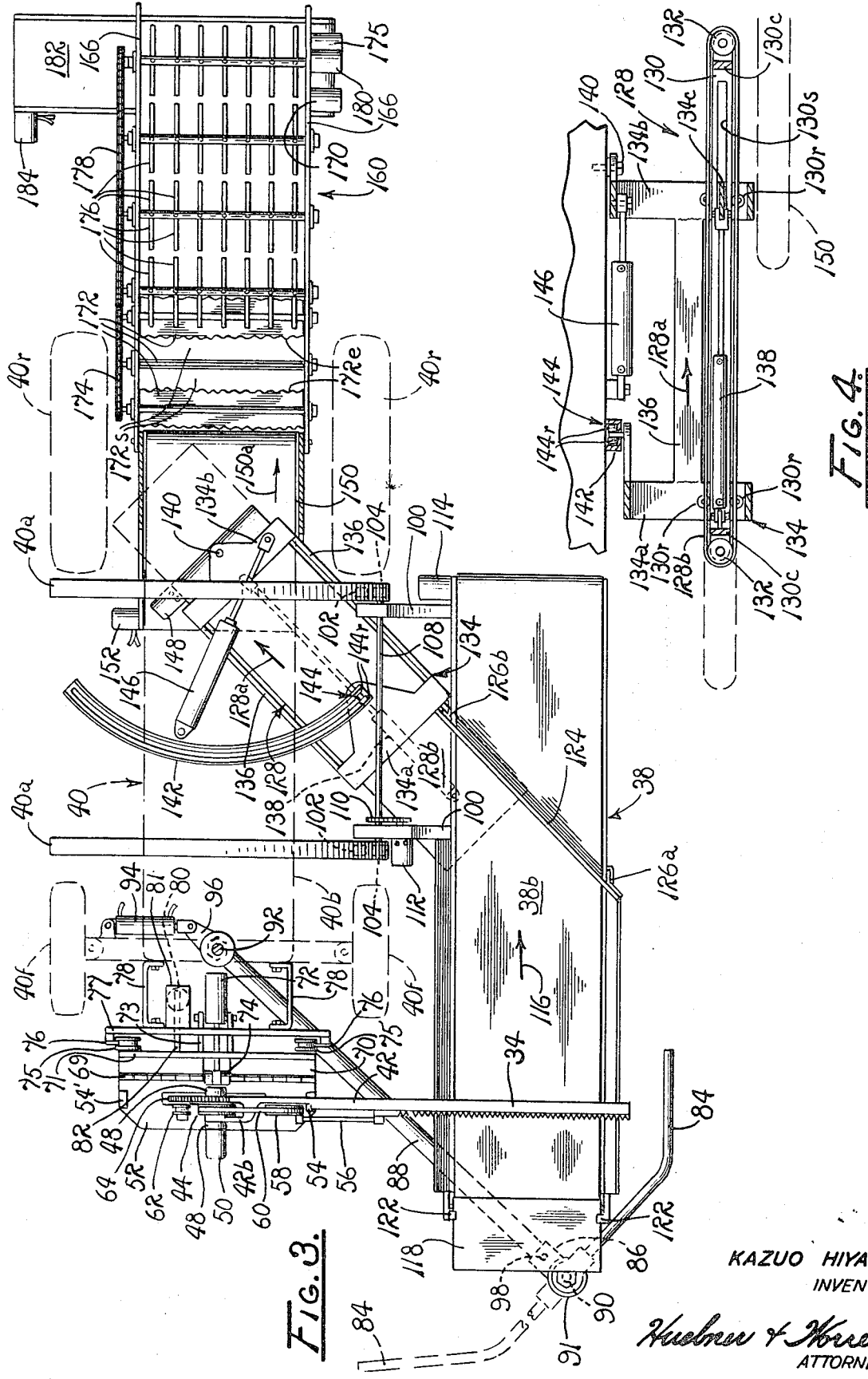

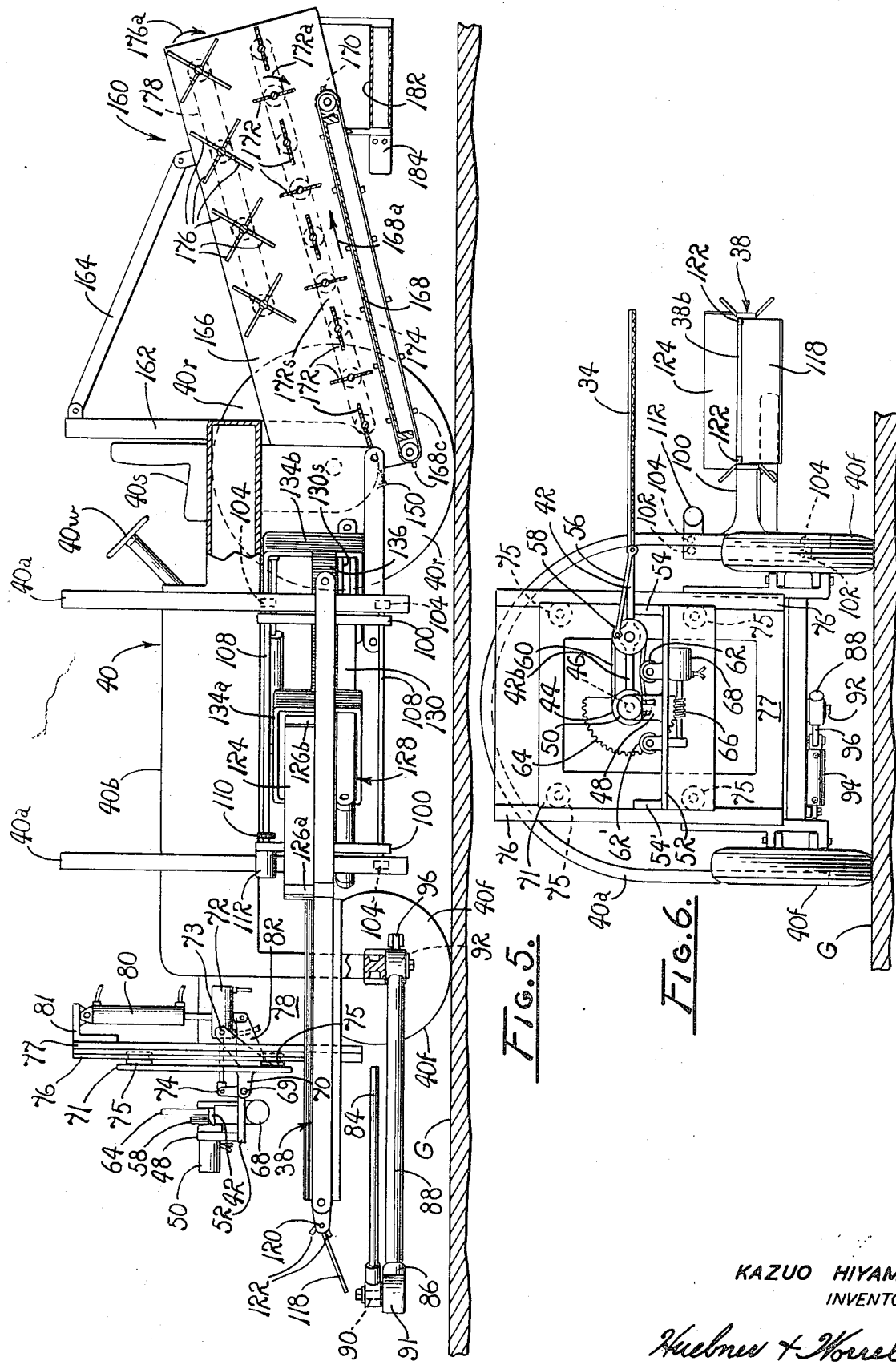

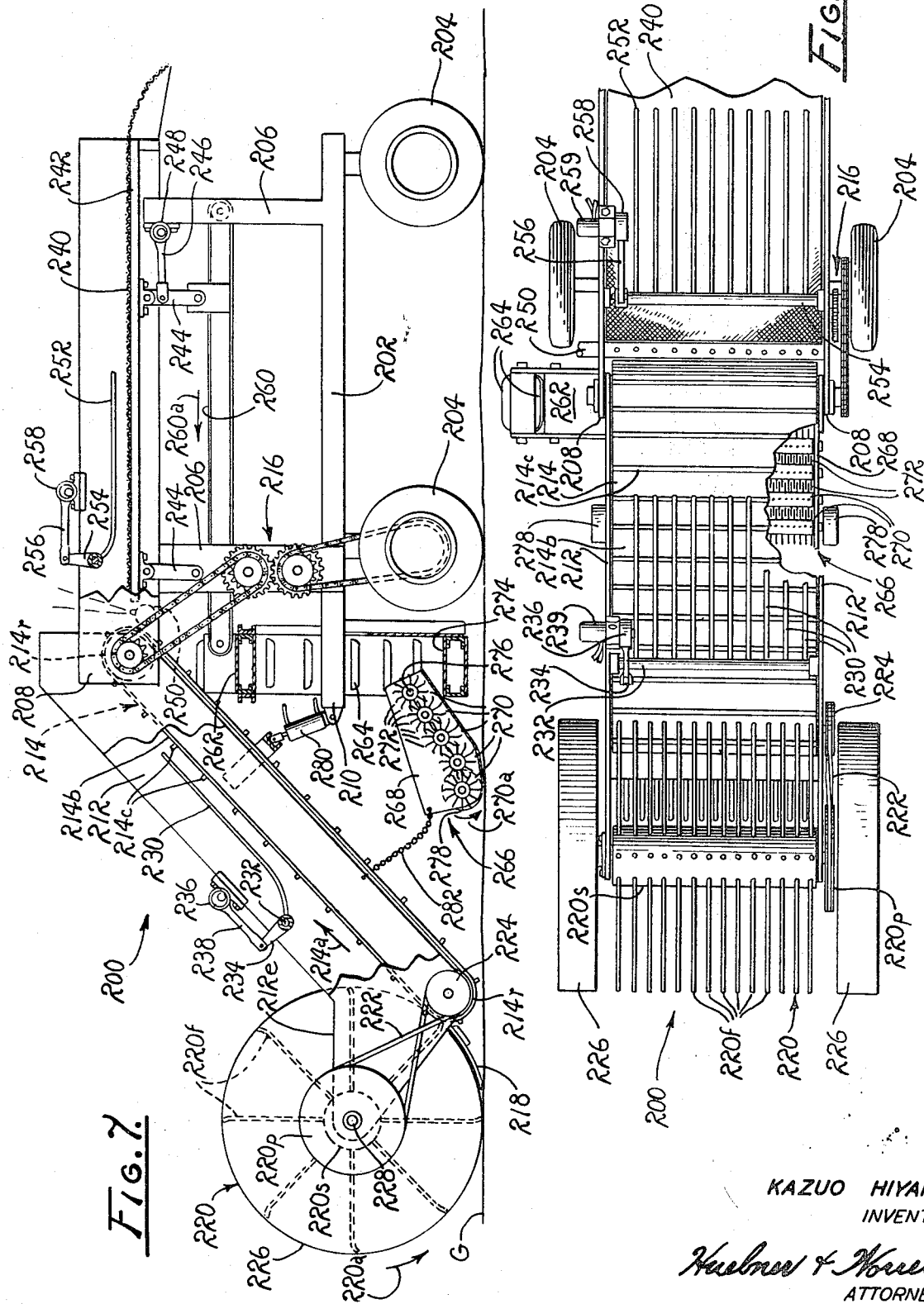

United States Patent Office 3,546,856
Patented Dec. 15, 1970

3,546,856
METHOD OF HARVESTING VINE BORNE CROPS
Kazuo Hiyama, 8184 E. Adams Ave.,
Fowler, Calif. 93625
Filed Mar. 8, 1968, Ser. No. 711,541
Int. Cl. A01g *19/00*
U.S. Cl. 56—1                22 Claims

ABSTRACT OF THE DISCLOSURE

A method for harvesting vine borne crops including training canes of the vines on an elevated trellis having removable supporting lines, supporting the canes on the lines while their crop matures, removing the lines from the canes, severing the canes with their crop borne thereby from the vines, and separating the crop from the canes; and a mobile apparatus having a power driven cutter for severing the canes from the vines, a power driven conveyor for removing the severed canes and crop from the trellis, and power actuated means for separating the crop from the canes.

BACKGROUND OF THE INVENTION

The present invention relates to a plant husbandry method and apparatus for crop producing vines, such as grapevines and the like, and more particularly to such a method and apparatus adapted to mechanize and to render more efficient and economical the harvest of vine borne crops heretofore requiring extensive, tedious, and consequently expensive hand labor.

In the harvesting of any crop, it is, of course, desirable to harvest the crop after it has matured sufficiently for good quality to be attained. When a crop is picked too early, the quality thereof is normally impaired. On the other hand, if it is not picked early enough, pickers may not be available because of being busy on other crops. In no instance is this common dilemma of the farmer more aggravated than as encountered by the raisin farmer of the San Joaquin Valley of California. The harvest season from the attainment of proper or tolerable maturity until the first seasonal rains is frequently only ten days or so. In many instances, shortages in hand labor preclude harvesting in such a brief period. Accordingly, where harvesting is delayed the risk of rain before the crop has been harvested, or after it has been harvested but before it has been dried and cured to form raisins, is severe. This is particularly true in the case of processing grapes in the field on paper trays for conversion into raisins. In such case, the trays catch and retain the rain and the undersides thereof provide surfaces on which ground moisture condenses, thus preventing quick drying, prolonging the moist condition of the grapes and the trays, and subjecting both the grapes and trays to the attendant danger of spoilage.

It has long been recognized that a speedier and more dependable means of harvesting such crops would permit the attainment of crop maturity with greater production and higher quality while permitting adequate drying and curing time to minimize loss due to rain.

Further, as raisin prices have held steady or decreased, hand labor costs have vastly increased, in some instances having multiplied, making continued raisin production in many areas economically impractical. Thus, the raisin and other vine crop farmers have been confronted with the necessity of mechanizing or facing rapid economic ruin.

SUMMARY OF THE INVENTION

It is therefore an object of the present invention to provide a method of plant husbandry for the harvesting of grapes and other vine borne crops in a rapid and reliable manner.

Another object is to provide a method of automatically harvesting grapes and other vine borne crops which does not rely upon picking by hand with a resultant saving in labor and economy of cost in harvesting fruit.

Another object is to provide a method and apparatus for harvesting grapes and processing them into raisins which is labor saving, economical and provides raisins of better quality.

Another object is to provide a method and apparatus for quickly harvesting vine borne crops in large volumes so as to minimize the duration of the required harvest season to permit the attainment of better maturity, and the availabiliy of longer curing and processing time prior to fall rains.

Another object is to provide a method of processing grapes into raisins in which the use of paper trays can be eliminated and the drying grapes are fed by their canes during drying to produce raisins of higher quality and greater weight.

Another object is to provide a method and apparatus for harvesting grapes and other vine borne crops in which the crops are handled more gently to avoid bruising and resultant quality impairment.

Another object is to provide a method of plant husbandry in which the major portion of the cutting of vine growth is performed automatically and subsequent pruning costs are minimized.

A further object is to provide a plant husbandry method in which the amount of pruning to be done by hand is confined to the trunks of the vines or closely adjacent thereto and is small and selective.

The aforementioned and other objects and advantages are achieved by training the canes of the vines on trellises having removable or expendable lines laterally adjacent to the trunks of the vines, removing the lines from the canes, severing the canes bearing their crop from their vines, conveying the cut canes and associated crop from the trellis, and removing the crop from the canes or depositing the same in a drying area and drying the crop on the canes. In the case of the former, the canes with the fruit removed therefrom are shredded and returned to the soil for enrichment thereof. In the case of the latter, the grapes are permitted to dry on the canes, being fed to some extent thereby as they are drying, after which the raisins are removed therefrom and the canes then shredded for return to the soil.

During dormancy, the canes remaining on the trunks are pruned in a manner to provide for training subsequent new growth in a common direction along the row of vines, the direction of training along the row being reversed each year for balanced growth of the vines. After replacement of the removable or expendable supporting lines and training of the canes laterally of the row outwardly thereon during the new growing season, the process is repeated.

BRIEF DESCRIPTION OF DRAWINGS

FIG. 3 is a top plan view of the harvesting apparatus of FIG. 2, the tractor being shown in dashed lines.

FIG. 4 is a fragmentary vertical section illustrating the manner of supporting one of the conveyors of the harvesting apparatus of FIG. 3.

FIG. 5 is a side elevation, partly in section, of the harvesting apparatus of FIG. 3.

FIG. 6 is a front elevation of the harvesting apparatus of FIG. 3.

FIG. 7 is a side elevation, partly in section, of an apparatus for the pickup and retrieval of raisins in the harvesting thereof.

FIG. 8 is a fragmentary plan view of the apparatus of FIG. 7 with parts omitted.

DESCRIPTION OF EMBODIMENT

Figure 1:
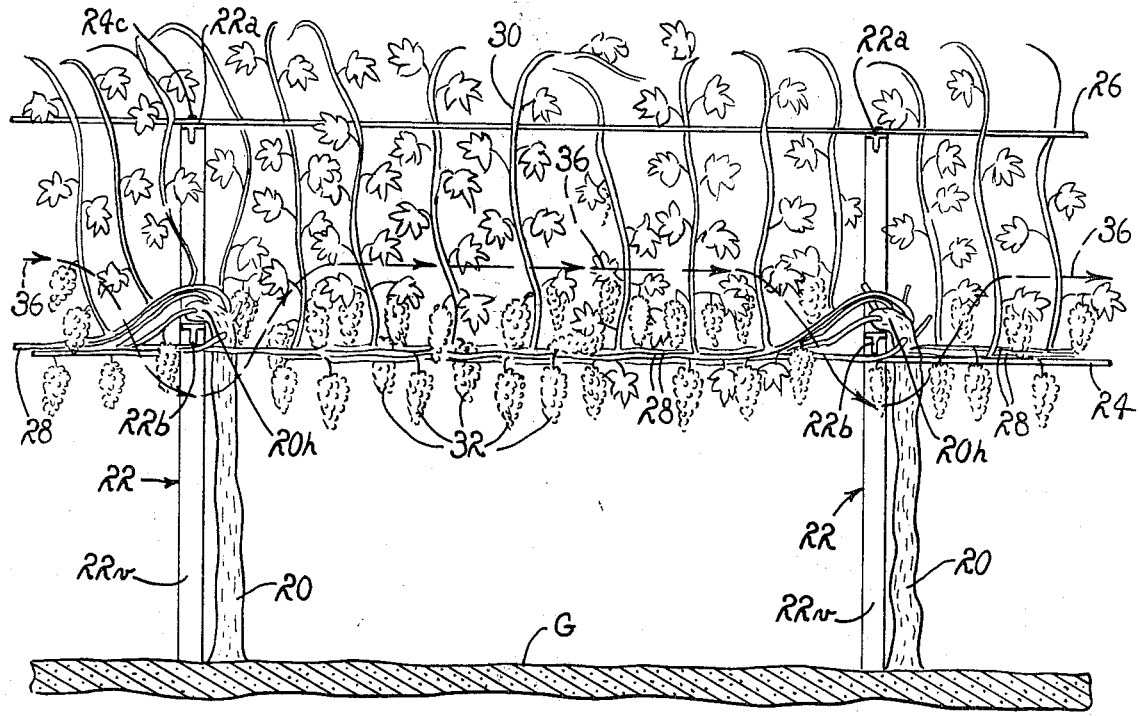
FIG. 1 is a fragmentary elevational view illustrating a vine row embodying the principles of the present invention.
Figure 2:
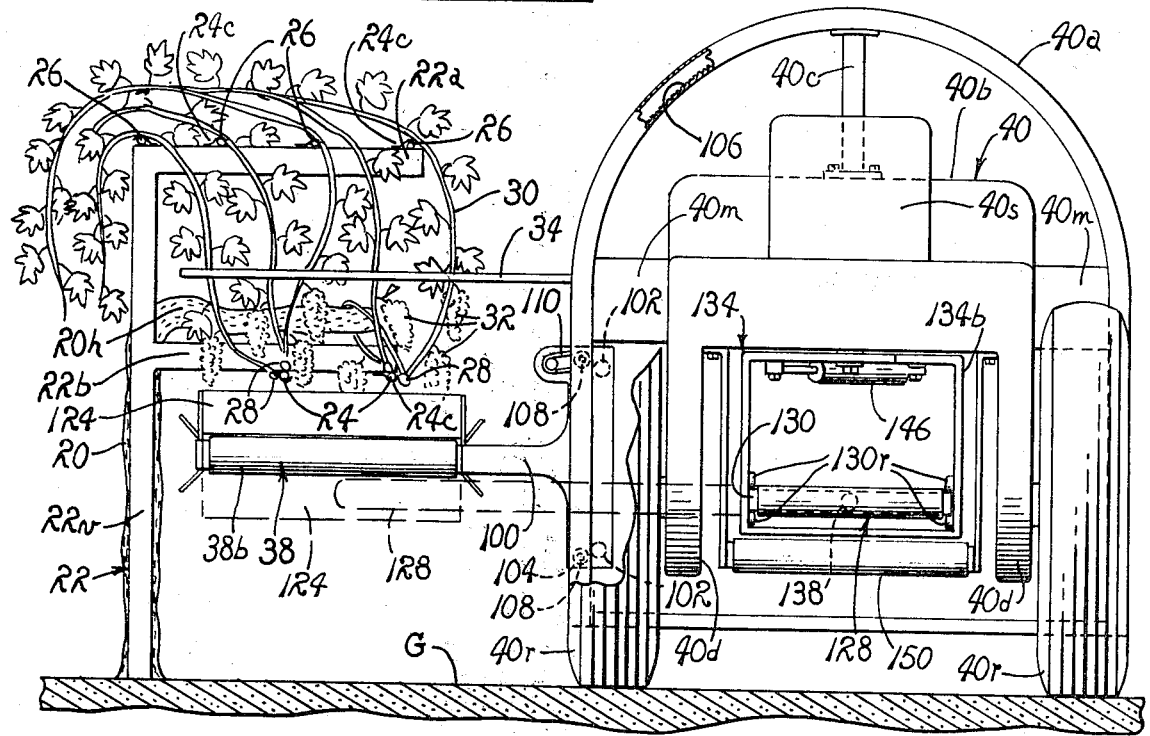
FIG. 2 is an end elevation of the vine row of FIG. 1 also showing a tractor-mounted harvesting apparatus of the present invention.

Referring to the drawings, particularly to FIGS. 1 and 2 thereof, there are illustrated vines 20 suitably spaced in a row usually oriented to take advantage of the rays of the sun subject to the dictates of the contour and other physical characteristics of the ground in any geographical area. Adjacent to each of the vines is a trellis or support 22 of suitable material having sufficient strength and durability, for example, steel. The support 22 is formed with a vertical support portion 22v and a pair of laterally extending arms 22a and 22b vertically spaced to provide bi-level support above a ground surface G. The support arm 22b is adapted to support a laterally directed portion 20h of the trunk of the vine 20 and has detachably secured thereto a plurality of supporting lines 24. The lines 24 may take the form of wires or cordage extending the length of the row of vines and detachably secured to the support arms 22b, as by clips 24c or the like, for a purpose later appearing. The support arms 22a also have connected thereto a plurality of supporting lines such as wires 26, or the like, also extending the length of the row but preferably fixed to the several support arms 22a, as by clips 24c or other suitable securing devices. It is to be noted that the support arms 22a and 22b define with the vertical portion 22v an F-shaped trellis with a U-shaped opening which opens laterally away from the vertical support portion 22v. If desired, support arms 22a and 22b may be made longer and extend across the vertical portion 22v so as to provide a double F-shaped trellis at each vine with lines 24 and 26 on each side of the vine 20 but for reasons soon to become apparent, the arms preferably extend in a single lateral direction from each row.

The lines 24 serve to support canes 28 growing out of the several vines and trained thereon to grow in one direction longitudinally of the row. The canes in the row are trained in one direction for facilitating removal of the lines 24 after they have been detached from the support arms 22b by releasing the clips 24c, the pulling of the lines being done at the end of the row toward which the canes have been trained. For balanced growth of the vines, the canes are trained in successive years to grow in opposite directions longitudinally of the row. The lines 26 normally remain attached to the support arms 22a in order to maintain the spaced relation of the support arms 22b during pulling of the lines 24 and also to furnish support for the vertical growth emanating from the trained canes which provides a cover of verdure or umbrage 30 for shading and protecting fruit or grapes 32 against the effect of a blistering hot sun.

In the practice of the present invention to harvest the fruit 32, lines 24 are first detached from the clips 24c and then pulled out longitudinally of the row in the longitudinal direction the canes are trained. Such pulling is preferably achieved by a windlass or the like, not shown, and the rows or the portions of the rows from which continuous lines are pulled are of such length as to permit such pulling to be readily accomplished and the withdrawn lines easily handled in coiled form. When the lines are withdrawn, the canes sag somewhat but retain their approximate positions. As shown in FIG. 2, a suitable cutter, such as a sickle bar 34, or the like, is caused to move in a path at a level between the support arms 22a and 22b but to dip below the support arm 22b in the vicinity of the trunk of the vine 20, as indicated by the arrowed line 36 in FIG. 1. Where the lines 24 consist of cordage, it may be cheaper to leave the cordage in place and cut it by the aforementioned movement of the sickle bar 34.

The cut canes 28 with the associated grapes 32 drop upon an endless belt conveyor 38 for removal of the canes and grapes from the trellis for fresh sale, wine making, or the processing thereof into raisins in a manner later described. Conveyor 38 is of conventional type with the usual inner supporting frame and end rollers, not shown, about which an endless belt 38b is trained.

If desired, umbrage 30 may be defoliated by searing it with heat or spraying it with a suitable solution a week or two before harvest. Such defoliation provides for development of color in the grapes in the latter stages of maturity prior to harvest, which is usually at that time of year when the sun is lower in the sky and has a reduced heating effect.

Referring also to FIGS. 3–6, the sickle bar 34 and the conveyor 38 are supported on a tractor designated generally by reference numeral 40. Tractor 40 is preferably of the type that provides a considerable amount of vertical clearance between the ground surface G and the tractor body 40b which is supported on a pair of front wheels 40f and rear wheels 40r, the latter being mounted for rotation on depending portions 40d which contain suitable gearing, not shown, for driving the wheels 40r. Tractor 40 has the usual operator's seat 40s and a steering wheel 40w. Additionally, tractor 40 supports a pair of inverted U-shaped tracks or arches 40a formed of channel members and suitably secured thereto as by mounting brackets 40m and connecting columns 40c, best seen in FIG. 2.

Inviting attention to FIGS. 3, 5 and 6 and to the forward part of the tractor 40, the sickle bar 34 is supported for reciprocatory movement on a support arm 42 formed with a bifurcation 42b. Disposed between the legs of the bifurcation 42b is a drive pulley 44 connected to a shaft 46 rotatably mounted in a pair of standards or brackets 48 and driven by an hydraulic motor 50. The brackets 48 are upstandingly secured to a support platform 52. The legs of the bifurcation 42b are provided with suitably journaled openings which receive the shaft 46 for pivotally mounting the arm 42 thereon in order that the arm may be swung from one side of the tractor to the other in order to dispose the sickle bar 34 in operative position at each side of the tractor. To support the arm 42 in either operative position of the sickle bar 34, the arm is adapted to rest upon either one of a pair of upstanding rests 54, 54' secured to the platform 52.

The sickle bar 34 is reciprocated by a connecting rod or pitman 56 pivoted at one end to the sickle bar and eccentrically connected at the other end to a pulley 58 driven by a belt 60 from the pulley 44. As best seen in FIG. 6, the belt 60 is provided with an amount of slack adapted to be taken up by engaging the belt with an idler pulley 62 vertically adjustably mounted on the platform 52. A similarly mounted idler pulley 62' serves the same purpose when the sickle bar is in operative position to the other side of the tractor. Thus, when the sickle bar is swung upwardly from operative position, the belt 60 is slack and no drive is imparted to the sickle bar.

Swinging of the arm 42 may be accomplished by a sector gear 64 rigid with one of the legs of the bifurcation 42b and geared to a worm gear 66 driven by a reversible hydraulic motor 68.

The platform 52 is pivotally mounted, as at 69, on a forwardly extending projection 70 of a vertically movable support 71. The platform 52 is thus mounted for swinging or tilting movement about a generally horizontal axis, which movement is imparted thereto by an hydraulic ram 72 pivoted to bracket arms 73 fixed to the support 71 and connected to an arm 74 fixed to the platform, best seen in FIGS. 3 and 5.

The vertically movable suport 71 is provided with a plurality of grooved rollers 75 in engagement with parallel track members 76 mounted on a generally vertically disposed stationary support 77 affixed to the tractor 40 by brackets 78, or the like. Vertical movement is imparted to the support 71 by means of an hydraulic ram 80 depending from an angle member 81 affixed to the stationary support 77, the other end of the hydraulic ram 80 being connected to an arm 82 affixed to the support 71.

Operation of the hydraulic rams 72 and 80 is controlled in a manner to cause the sickle bar 34 to follow the path indicated by the arrowed line 36 in FIG. 1. This may be accomplished by hydraulically controlled program mechanisms of suitable type, not shown, which are geared to the travel of the tractor 40 and activated as the sickle bar approaches the vine 20. For this purpose there is provided a swingable control arm 84 pivotally mounted on a sleeve 86 carried on the distal end of a hollow support boom 88. The control arm is connected to a shaft 90 forming part of a valve 91 controlling the flow of hydraulic fluid through flexible conduits or piping contained within the boom 88 and connected to the aforementioned programmed control mechanisms. The support boom 88 is diagonally disposed so as to support the control arm 84 laterally outwardly of the sickle bar 34, best seen in FIG. 3. Thus, upon forward movement of the tractor, the control arm 84 is adapted to engage the trunk of a vine 20 and be swung toward the tractor, thereby to activate the programmed control mechanisms for lowering and tilting the sickle bar 34 downwardly to pass under the support arm 22b and thereafter raising and tilting the sickle bar upwardly to dispose the same at its normal cutting level.

Provision is also made for selectively operating the rams 72 and 80 independently of the programmed control mechanisms for tilting and lowering the platform 52, after the sickle bar has been raised to substantially upright position, in order that the sickle bar may be disposed out of the way of the conveyor 38 as it is swung to the other side of the tractor. After the conveyor 38 is operatively disposed, rams 68, 72 and 80 are operated for properly disposing the sickle bar over the conveyors 38 in its new position.

In order that the control arm 84 may be properly disposed with respect to the row of vines when the sickle bar 34 is in use on the other side of the tractor, the boom 88 is mounted on a vertical stub shaft 92 for pivoting about the axis thereof, the shaft being suitably supported from the tractor 40. Associated with the boom 88 is an hydraulic ram 94 connected between the tractor and an arm 96 fixed to the boom for selectively positioning the boom with respect to the tractor. Thus, boom 88 may be positioned to project obliquely to either side of the tractor for operation or it may be positioned to be centrally disposed for transport. To render the control arm 84 effective in either diagonal disposition of the boom 88, the sleeve 86 is mounted for turning 180 degrees and has diametrically opposite openings in which a spring-pressed detent 98 mounted on the boom 88 is alternatively adapted to engage for selectively disposing the control arm properly with respect to the boom 88 depending upon the operative disposition of the boom. The alternative positions of the control arm will be appreciated from the full and dashed line showings thereof in FIG. 3.

Inviting attention to FIG. 2 and the arches 40a, the conveyor 38 is supported from the arches by means of a pair of support brackets 100. Each bracket 100 carries a pair of rollers 102 inside the arch and a pair of cogs or pinions 104 engaged with a toothed track or rack 106 formed on the inner side of a flange of the channel members making up the arches 40a. A pair of shafts 108, best seen in FIGS. 3 and 5, interconnect opposite corresponding cogs 104. Operatively connected to one of the shafts 108, by means of sprockets and a chain 110, is an hydraulic motor 112 for driving the cogs connected to the shaft for moving the conveyor 38 from one side of the tractor to the other. If desired, the motor 112 may be controlled to dispose the conveyor 38 above the tops of the arches 40a for transport purposes, support arm 42 and sickle bar 34 also being supported in substantially upright position for transport purposes.

Referring to FIG. 3, the conveyor 38 is powered by a reversible hydraulic motor 114 in order that the upper run of the endless belt 38b may be caused to move rearwardly in the direction of arrow 116 when it is disposed on one side of the tractor or inverted on the other. Material to be conveyed is deflected upwardly onto the rearwardly moving upper run of the conveyor 38 by a forwardly projecting deflecting plate 118 pivotally mounted at the forward end of the conveyor, as at 120, and is adapted to be operatively disposed relative thereto by engagement with one of a pair of stops 122 depending on which side of the tractor the conveyor 38 is disposed. Also associated with the conveyor 38 is a deflector or plate 124 disposed diagonally across the upper run of the conveyor to deflect material moving rearwardly on the upper run thereof into the space between the front and rear tractor wheels adjacent thereto. The plate 124 is detachably connected, as at 126a and 126b, for easy removal and reconnection to be disposed over the upper run of the conveyor 38 when it is disposed on the other side of the tractor, as will be appreciated from the showing of the plate in dashed lines in FIG. 2. The plate 124 deflects material on the rearwardly moving upper run of conveyor 38 onto a conveyor 128 having an endless belt 128b disposed diagonally and projecting between the tractor wheels and under the conveyor 38, the upper run of the belt moving in the direction of the arrow 128a.

Referring also to FIG. 4, the conveyor 128 has the usual supporting frame 130, which is provided with cross members 130c and a slot 130s, and has rollers 132 at the ends thereof, the endless belt 128b of the conveyor passing around the frame and the rollers in the usual manner. Support frame 130 is suitably supported on rollers 130r for sliding in a box-like framework or cradle 134 made up of a pair of open rectangular frames 134a and 134b interconnected by members 136. Frame 134b has a cross member 134c passing through the slot 130s. An hydraulic ram 138 is suitably connected to the cross member 134c and one of the cross members 130c and serves to effect relative movement therebetween.

Frame 134b is connected to the tractor 40 by a pivot pin 140 for pivoting about a substantially vertical axis. An arcuate track 142 suitably secured to the tractor 40 supports the frame 134a by means of a support mechanism 144 having rollers 144r for movement of the cradle 134 from one side of the tractor to the other. Movement is imparted to the cradle 134 by an hydraulic ram 146 conveniently connected between the frame 134b and the tractor. For operatively relating the conveyor 128 to the conveyor 38, the rams 138 are operated to slide the frame 130 so that one end of the conveyor 128 projects through the space between the wheels of the tractor on one side and under the conveyor 38, as shown in FIGS. 3, 5 and 6. To relate the conveyor 128 to the conveyor 38 when the latter is disposed on the other side of the tractor, the rams 138 and 146 are selectively operated to withdraw the conveyor 128 into the space below the body of the tractor and dispose the cradle 134 in an intermediate position in which it is substantially aligned with the longitudinal axis of the tractor as shown in FIG. 2. In such position, the conveyor 128 extends rearwardly of the frame 134b to the extent shown in dashed lines in FIG. 3, whereupon the rams are operated to swing the conveyor to the other side of the tractor and to extend it through the opening between the wheels of the tractor on the other side thereof.

If desired, the conveyor 128 may be disposed in the aforementioned intermediate position during transport from one working area to another.

One of the rollers 132 of the conveyor 128 has an hydraulic motor 148 connected thereto for rotating the same in a direction to cause the upper run of the endless belt of the conveyor to move in a direction of the arrow 128a away from the conveyor 38, material carried thereby being discharged onto an endless belt conveyor 150 of conventional type powered by an hydraulic motor 152 in a manner to cause the upper run of the endless belt of the conveyor to move rearwardly in the direction of the arrow 150a.

The operation of the harvesting apparatus described thus far will be briefly summarized. The fruit bearing canes severed from the supporting cover of verdure and the vine drop onto the conveyor 38 and are deflected therefrom by plate 124 onto conveyor 128 which discharges onto conveyor 150. If the grapes are to be converted into raisins, conveyor 150 discharges the cut canes onto the ground surface G which has preferably been smoothed and compacted, as by scraping and rolling, and prepared, as by spraying with a coating material or covering the surface with a layer of paper or plastic or other suitable material. The grapes are then allowed to dry on the canes which continue to feed the drying grapes. The drying of the grapes is aided by the heat of the ground and the circulation of air around the grapes which in many cases are supported above the ground surface by the canes. After the grapes have dried into raisins, they are harvested or picked up by mechanical harvesting apparatus later described.

Inviting attention to FIGS. 3 and 5, when the grapes are to be used for the making of wine, the conveyor 150 delivers the grape bearing canes to a grape separating apparatus, designated generally by reference numeral 160, suitably supported on the tractor 40 by brackets 162 and links 164 and extending rearwardly from the tractor.

Apparatus 160 includes side support members 166 which suitably support an endless belt conveyor 168 of conventional type, the upper run of which is adapted to be driven in the direction of the arrow 168a by an hydraulic motor 170. Mounted in the side members 166 above the conveyor 168 is a series of generally planar paddles 172 interconnected by chains 174 or the like and driven by an hydraulic motor 175. Viewing FIG. 5, it will be noted that the paddles 172 rotate in the direction of the arrow 172a and that alternate paddles are disposed with the plane thereof generally perpendicular to the plane of the other paddles. Such relationship continually exists between adjacent paddles during rotation and provides a space or opening 172s between the edges of one paddle and the generally planar surface of an adjacent paddle. As seen in FIG. 3, each paddle 172 preferably has scalloped edges 172e which serve to engage the canes received from the conveyor 150 and advance such canes rearwardly for discharge from the rear end of the apparatus 160.

Also mounted in the side members 166 above the paddles 172 is a series of rotating flexible fingers or beaters 176 interconnected by chains 178 or the like for rotation in the direction of the arrow 176a and driven by an hydraulic motor 180. The fingers 176 are made of rubber or other suitable material and serve to beat or shake the canes as they are advanced rearwardly by the paddles 172 for shaking loose the grapes borne by the canes which fall through the aforementioned openings 172s between the paddles and onto the conveyor 168, which may be provided with cross cleats 168c, if desired.

At its rear end, the conveyor 168 discharges onto a cross conveyor 182 of endless belt type driven by an hydraulic motor 184. The conveyor 182 feeds the harvested grapes onto a suitable conveyor, not shown, which elevates the grapes into a gondola moving in following relation behind the apparatus 160 or on the other side of the adjacent row of vines, as convenience suggests.

In the case where the cut canes with the grapes thereon have been deposited for drying of the grapes into raisins, pick-up apparatus 200 of the type shown in FIGS. 7 and 8 is employed for harvesting or picking up the raisins. The apparatus 200 consists essentially of a supporting frame 202 mounted on wheels 204 and may be self-propelled or propelled by a separate prime mover such as a tractor or the like. The frame 202 includes uprights 206 and forwardly extending portions 208 and 210. Pivotally mounted on the portions 208 is a pair of side support members 212 supporting an endless belt conveyor 214 in inclined position, as shown in FIG. 7. The conveyor has a pair of rollers 214r about which is trained an endless belt 214b provided with cleats 214c and adapted to be driven in a direction such that the upper run thereof carries material upwardly and rearwardly in the direction of the arrow 214a. This may be accomplished through the medium of suitable interconnection between the upper roller 214r and one of the wheels 204, such sprockets, chains, gears, and the like, designated generally by reference numeral 216. Alternatively, the conveyor could be otherwise suitably driven, as by an hydraulic motor, not shown.

Fixed to the lower ends of the side supports 212 are a plurality of arcuate guide fingers 218 extending forwardly and disposed adjacent to the ground surface G on which the cut canes and raisins are supported for the purpose of receiving and guiding the same upwardly onto the conveyor 214 during forward travel of the apparatus 200. Operatively related to the fingers 218 is a feeding wheel or sweeping brush 220 adapted to be driven in the direction of the arrow 220a and having flexible fingers 220f carried by a hollow shaft 220s, FIG. 8. Side supports 212 are provided with generally triangular extensions 212e on which the ends of the shaft 220s are supported for rotation, one of the shaft ends having a pulley 220p interconnected by cross-over belting 222, or the like, to a pulley 224 connected to the lower roller 214r. Coaxial with the feeding wheel 220 is a pair of ground-engaging depth-gauge wheels 226 journaled on the ends of a shaft 228 extending through the shaft 220s.

The driving interconnections are so proportioned that the endless belt 214b moves at a speed substantially equal to the ground speed of the apparatus 200 and the tips of the flexible fingers 220f having a peripheral speed equal to or slightly greater than the ground speed of the apparatus. The tips of the fingers 220 thus sweep close to the ground surface for sweeping or feeding material thereon onto the guide fingers 218 and the conveyor 214.

Material conveyed upwardly by conveyor 214, such as the cut canes with raisins thereon, is subjected to the action of a beater 230 which is mounted for oscillatory movement about the axis of a rock shaft 232 having a rock arm 234 which is swung by means of a rotary eccentric 236 and a connecting rod 238. The eccentric 236 may be driven by an hydraulic motor 239 or in any other suitable manner.

At the upper end of the conveyor 214 the canes and raisins are discharged onto a shaker or reciprocating screen 240 suported by a body structure 242 mounted on the frame 202 and pivotally connected thereto by generally parallel links 244. Pivoted to one of the links 244 is a connecting rod 246 actuated by a rotary eccentric 248 suitably driven, for example, as from one of the wheels 204 or by an hydraulic motor, not shown.

In passing from the conveyor 214 to the screen 240 the raisins are subjected to a blast or current of air provided by a suitable conduit 250 connected to a source of pressurized air, not shown, the air current being of an intensity which helps the raisins negotiate bridging the space and blows away dust and other debris from the raisins but does not blow away the raisins themselves.

Mounted on the body structure 242 above the screen 240 is a beater 252 connected to a rock arm 254 oscillated by a connecting rod 256 and a rotary eccentric 258 suitably driven by an hydraulic motor 259 from a wheel 204 or otherwise, as desired.

Screen 240 has a mesh size which is adapted to pass loosened raisins onto an endless belt conveyor 260 driven in a manner to cause the upper run thereof to move forwardly in the direction of the arrow 260a. With the canes on the screen 240 subjected to further beating by the beater 252, substantially all the raisins are separated from the dried canes and pass through the screen 240 to the conveyor 260 therebelow. The conveyor 260 discharges the raisins onto a horizontal transverse endless belt conveyor 262 which delivers to a generally vertically disposed endless chain of buckets 264 moving upwardly, or any other suitable means, which may discharge into a suitable container, not shown, on the vehicle frame 202, or into a gondola, not shown, running alongside the apparatus 200, or onto still another conveyor, not shown, as desired. It is understood, of course, that the conveyors are suitably driven in the designated directions of transport.

Raisins that have become loosened from the canes and have fallen to the ground surface G which escape from and are not retrieved by the feeding wheel 220 and the conveyor 214 are adapted to be picked up by a retrieval system 266. The retrieval system includes an inclined trough 268 and a series of sweeping wheels or brushes 270 driven in the direction of the arrow 270a by suitable interconnection with each other and one of the wheels 204 or by an hydraulic motor, not shown. The brushes 270 have flexible fingers 272, disposed in overlapping relation, as shown in FIG. 8, the fingers of the leading brush serving to sweep and pick up the raisins on the ground surface and pass them to the fingers of the next brush which pass the raisins successively to the succeeding brushes. In such manner, the raisins are moved along up the trough 268 until they are swept over the upper end thereof onto a horizontal transverse endless belt conveyor 274 delivering to the upwardly moving buckets 264. If desired, an air blast device similar to conduit 250 may be associated with the retrieval system 266 to blow debris and dust away from the retrieved raisins.

The pivotal mounting of the upper ends of the side supports 212 on the frame portions 208 and support of the lower ends thereof on the wheels 226 provides a floating arrangement which can follow the contour of the ground. Trough 268 may be similarly floatingly arranged by providing for pivoting thereof about an axis 276, which may coincide with the rotational axis of the rearmost brush 270, and support of the leading thereof on ground-engaging depth-gauge wheels 278 coaxial with the rotational axis of the leading brush 270, as shown in FIG. 8.

For transport purposes, an hydraulic ram 280 is suitably connected between the frame portion 210 and the side supports 212, and flexible connections 282, such as chains or the like, interconnect the side supports and the trough 268. Thus, when the ram is energized, the wheels 226 and 278 are lifted clear of the ground; but when de-energized, the side supports and trough can float independently of each other.

OPERATION

The operation of the apparatus and method of the present invention are believed to be clearly apparent and are briefly summarized at this point. Initially, F-shaped supports 22 are inserted in the ground, one adjacent each vine 20, supporting lines 24 and 26 are attached to the supports, lines 24 being detachably secured by the clips 24c. The canes growing out of the vines are trained on the lines 24 all in the same direction longitudinally of the row. After the grapes have matured sufficiently for the purpose desired, be it for wine making, fresh sale, or conversion into raisins, and it is determined that the grapes should be picked in a week or two, the umbrage or cover of verdure 30 is defoliated as by spraying with a suitable solution or searing with heat.

When the time has arrived for picking the grapes, removable lines 24 are detached from the support arms 22b and the lines are pulled out in the direction in which the canes have been trained thereon. The fruit bearing canes are now supported by the vine trunk and the vertical growth of the umbrage 30. In the case of inexpensive cordage, it may be cheaper to leave the lines 24 in place and cut them during harvesting.

Assuming that the grapes are to be picked for the purpose of making wine, the apparatus shown in FIGS. 3, 5 and 6 is employed and is disposed adjacent to the vine row with the conveyor 38 disposed below to move in a path under the arms 22b and the sickle bar 34 is positioned at a level to move through the U-shaped space defined by arms 22a and 22b and the vertical portion 22v, as shown in FIG. 2. As the tractor 40 propels the apparatus along the row, the sickle bar 34 cuts the vertical growth of the umbrage 30 and the cut canes with the grapes thereon fall onto the conveyor 38 and are conveyed rearwardly thereby. As the sickle bar 34 approaches a vine 20, the arm 84 is engaged and swung by the trunk of the vine, causing the hydraulic rams 72 and 80 to be actuated for lowering and tilting the platform 52 so that the sickle bar 34 carried thereby passes underneath the support arm 22b and leaves uncut some of the canes growing out of the trunk of the vine, such action occurring at each vine.

The cut canes on the conveyor 38 are deflected by the plate 124 onto the conveyor 128 which discharges them onto the conveyor 150 which feeds them to the grape harvesting apparatus 160. The apparatus 160 beats and shakes the cut canes for loosening the grapes therefrom, the grapes dropping through openings between the paddles 172 onto the conveyor 168 which discharges the grapes onto the cross conveyor 182 for eventual collection into suitable containers.

At the end of a vine row, the hydraulic motor 68 is operated to raise the sickle bar to a substantially upright position and the rams 72 and 80 are operated as necessary to position the sickle bar so it can be cleared during swinging of the conveyor 38 to the other side of the tractor, after which the sickle bar is operatively disposed over the conveyor. The boom 88 is swung to the other side of the tractor and the control arm 84 is repositioned. The apparatus is then ready for harvesting the next vine row.

If the grapes are to be converted into raisins, the apparatus 160 is omitted whereby the conveyor 150 may discharge the cut canes onto a descending ramp or decline, not shown, or directly to the treated ground surface G.

After the grapes have been dried and converted into raisins, which drying is facilitated and results in a raisin of better quality because of being in the main supported above the ground surface and providing for better circulation of the drying air thereabout and because of the drying canes continuing to feed the grapes during drying, the harvesting apparatus 200 shown in FIGS. 7 and 8 is propelled over the drying surface for harvesting the raisins. Feeding wheel 220 sweeps and feeds the cut canes toward the lower end of conveyor 214 which carries the cut canes upwardly for discharge onto the screen 240. While on the conveyor 214, the cut canes are subjected to a beating by the beater 230 which serves to loosen the raisins causing them to drop onto the conveyor for carriage to the screen 240, the raisins being subjected to a current of air from the conduit 250 for removal of dust and debris therefrom. The loosened raisins fall through the meshes of the screen 240 onto a conveyor 260 which discharges to the transverse conveyor 262 delivering to the upwardly moving buckets 264 for eventual collection in suitable containers.

The screen 240 is reciprocated to aid the falling of raisins therethrough and to feed the cut canes rearwardly for eventual deposit on the ground. Another beater 252 beats the cut canes while they are passing over the screen 240 for shaking loose any remaining raisins which then fall through the screen 240 and are conveyed away by the conveyor 260.

Raisins that have become loosened from the cut canes and have fallen to the ground surface are swept up the inclined trough 268 by means of the flexible fingers 272 and onto the transverse conveyor 274 for delivery to the buckets 264 for collection in suitable containers.

The uncut canes remaining on the vine trunks are properly pruned during the succeeding dormant season with a view to training new growth from the pruned trunk in a direction opposite to that in which the canes were trained during the immediately prior growing season. Eventually, the lines 24 are replaced and with the new growing season the canes are trained in a direction opposite to that in which they were trained the previous growing season in order that the vines have balanced growth. After maturity of the fruit, the aforedescribed cycle is repeated.

There has thus been provided a method of plant husbandry and apparatus for performing the method by which a harvest of grapes of improved quality is obtained in a facile and reliable manner and wherein the grapes are harvested mechanically and in a rapid and reliable manner, thus reducing the need for hand pickers which may be unavailable and whereby advantage may be taken of the rapidity of mechanical harvesting for optimum maturity of the grapes. Also, in converting the grapes into raisins, the method of the present invention provides for feeding of the grapes during drying and obviates the need for paper trays although such may be employed, if desired.

Although the invention has been herein shown and described in what is conceived to be the most practical and preferred method and apparatus, it is recognized that departures may be made therefrom within the scope of the invention, which is not to be limited to the details disclosed herein but is to be accorded the full scope of the claims so as to embrace any and all equivalent methods and apparatus.

Having described my invention, what I claim as new and desire to secure by Letters Patent is:

1. A method of harvesting vine borne crops comprising training canes of the vines on an elevated trellis having removable supporting means, supporting the canes on said means while growth forms on the canes and the crop matures, severing the growth from the canes, severing the canes with their crop borne thereby from the vines, and separating the crop from the canes.

2. A method of harvesting vine borne crops comprising training canes of the vines on an elevated trellis having removable supporting means, supporting the canes on said means while the crop matures, severing the canes with their crop borne thereby from the vines, and separating the crop from the canes, in which said supporting means is removed from the trellis after the crop has matured.

3. A method of harvesting vine borne crops comprising training canes of the vines on an elevated trellis having removable supporting means, supporting the canes on said means while the crop matures, severing the canes with their crop borne thereby from the vines, and separating the crop from the canes, in which said supporting means is removed from the canes after the crop has matured and prior to separating the crop from the canes.

4. The method of claim 3 in which the vines are disposed in a row, the vines are trained in a common direction laterally of the row at an elevation above the ground, and the canes are trained in a common direction longitudinally of the row.

5. The method of claim 4 in which the supporting means is a line which is removed from the canes by drawing it longitudinally of the row in the longitudinal direction in which the canes are trained.

6. The method of claim 2 in which the vines are disposed in a row, each vine has an upper portion substantially horizontally extended from the row in a common direction laterally thereof, the canes are trained from said horizontal portions of their respective vines in a common direction longitudinally of the row on a plurality of lines, and the lines are removed from the canes by drawing them longitudinally of the row in the direction that the canes are trained.

7. A method of harvesting crops from vines disposed in a row comprising training canes of the vines on an elevated trellis which provides support members individually adjacent to the vines having substantially horizontal arms extended therefrom in a common direction laterally of the row, the vines having substantially horizontal upper portions extended laterally of the row in the same common direction as the arms and rested on the arms of their respective support members, the trellis providing lines releasably mounted beneath the arms and extended longitudinally of the row and the canes being extended from said upper portions of their respective vines in a common direction longitudinally of the row; supporting the canes on the lines while the crop matures; releasing the lines from the arms; withdrawing the lines from the canes; and cutting the canes with their crop borne thereby from the vines in a continuous path which extends longitudinally of the row above the position previously occupied by the lines while between the vines and below said arms at the vines.

8. The method of claim 7 in which the canes are severed from their respective vines by first releasing the lines from the arms whereby the lines sag therefrom, and the canes are cut in a continuous path at an elevation above said substantially horizontal portions of the vines between adjacent vines in the row, which path extends downwardly adjacent to each vine, passes beneath the arm of its respective support member and thence returns upwardly to said elevation above said horizontal portions of the vines.

9. The method of claim 7 in which the support members have upper arms extended substantially horizontally from the row in substantially parallel relation to the arms upon which said upper portions of the vines are rested, additional lines are mounted on the upper arms and extend longitudinally of the row, and the canes have extensions which are trained upwardly from their respective canes and are supported on said additional lines.

10. The method of claim 9 in which the canes are severed from their respective vines by first releasing the lines mounted beneath the vine supporting arms and cutting the canes in a continuous path which extends longitudinally of the row above the position previously occupied by the lines while between the vines and below the arms at the vines.

11. The method of claim 9 in which the canes are severed from their respective vines and extensions by first releasing the lines from the vines supporting arms whereby the lines sag therefrom, and cutting the canes along a continuous path along the row at an elevation above the substantially horizontal portions of the vines between adjacent vines in the row, which path extends downwardly adjacent to each vine, passes beneath the supporting arm of its respective upright member and above the lines which have sagged therefrom, and thence returns upwardly to said elevation between the vines.

12. Process for producing raisins comprising training grape canes on removable supports, removing said supports after grapes have matured on the canes, cutting the canes with grapes thereon; drying the grapes on the cut canes for conversion into raisins, and separating the raisins from the cut canes.

13. A method of harvesting vine borne crops comprising training canes of the vines on an elevated trellis having lines on which the canes are supported, supporting the canes on the lines while the crop thereof matures, removing the lines from the trellis after the crop matures, severing the canes with the crop borne thereby from the vines after the crop matures, and subsequently separating the crop from the canes.

14. A method of growing and harvesting vine borne crops in which the vines are disposed in a row comprising training upper trunk portions of the vines to extend laterally of the row in upwardly spaced relation to the ground; training canes growing from said upper trunk portions along the row whereby subsequent growth from the canes extends upwardly therefrom and the crop is borne adjacent thereto; after said growth has occurred and the crop has been produced, cutting the canes growing from said upper trunk portions at positions in horizontally adjacent spaced relation to said trunk portions; and removing the cut canes with the crop borne thereby from the vines.

15. The method of claim 14 including leaving growth on the portions of the canes between where they are cut and said trunk portions to produce canes for the following year.

16. The method of claim 14 in which the canes are trained substantially horizontally along the row in substantially parallel laterally spaced relation to the row.

17. The method of claim 16 in which the canes and growth are cut in a substantially continuous path extended substantially horizontally along the row between the vines at an elevation above said horizontally trained canes to remove upwardly directed growth therefrom, thence downwardly in adjacent spaced relation to said trunk portion, thence beneath said trunk portion and thence upwardly in adjacent spaced relation to said trunk portion to said elevation.

18. The method of claim 17 including leaving growth on the portions of the canes between where they are cut and said trunk portions to produce canes for the following year.

19. The method of claim 2 in which the supporting means is removed from the trellis by severing the supporting means as the canes are severed.

20. The method of claim 14 in which the lines are removed by severing them from the trellis as the canes are severed from their vines.

21. A method of growing and harvesting vine borne crops in which the vines are disposed in a row, comprising training upper portions of the vines to extend substantially horizontally laterally of the row at a substantially common height above the ground; training canes growing from said upper portions of the vines substantially horizontally along the row in substantially parallel laterally spaced relation to the row whereby subsequent growth from the canes extends upwardly therefrom and the crop is borne adjacent thereto; and severing the crop, growth and portions of the canes from the vines along a substantially continuous path extended substantially horizontally along the row between the vines at an elevation above said height of the laterally trained upper portions of the vines, downwardly through the canes adjacent to said upper portions of the vines, beneath said upper portions of the vines, and thence upwardly through the canes adjacent to said upper portions of the vines to substantially said elevation.

22. A method of growing and harvesting vine borne crops in which the vines are disposed in a row comprising supporting the vines on a trellis having a disposable line extended along the row in substantially parallel spaced relation thereto, training canes of the vines along the line, and after a crop has matured on the canes concurrently severing the canes with their crop from the vines and the line from the trellis.

References Cited
UNITED STATES PATENTS

| | | | |
|---|---|---|---|
| 2,929,184 | 3/1960 | Lamouria | 56—1 |
| 3,328,944 | 7/1967 | Shepardson | 56—331 |
| 3,335,552 | 8/1967 | James | 56—1 |
| 3,472,004 | 10/1969 | Erby et al. | 56—1 |
| 3,490,217 | 1/1970 | Olmo et al. | 56—330 |
| 3,492,801 | 2/1970 | Olmo et al. | 56—330 |

RUSSELL R. KINSEY, Primary Examiner

U.S. Cl. X.R.

56—330